(12) United States Patent
Nishio et al.

(10) Patent No.: US 12,288,496 B2
(45) Date of Patent: Apr. 29, 2025

(54) INFORMATION PROCESSING APPARATUS AND CONTROL METHOD

(71) Applicant: Lenovo (Singapore) Pte. Ltd., Singapore (SG)

(72) Inventors: Masashi Nishio, Kanagawa (JP); Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/418,750

(22) Filed: Jan. 22, 2024

(65) Prior Publication Data
US 2024/0249657 A1 Jul. 25, 2024

(30) Foreign Application Priority Data
Jan. 23, 2023 (JP) .................. 2023-008189

(51) Int. Cl.
*G09G 3/20* (2006.01)
*G06F 3/01* (2006.01)
(52) U.S. Cl.
CPC .............. *G09G 3/20* (2013.01); *G06F 3/012* (2013.01); *G09G 2320/0626* (2013.01);
(Continued)
(58) Field of Classification Search
CPC .... G06F 1/3231; G06F 1/3265; G06F 1/3287; G06F 3/012; G09G 2320/0626;
(Continued)

(56) References Cited

U.S. PATENT DOCUMENTS

2013/0135196 A1* 5/2013 Park ................... G06T 11/001
348/78
2016/0235359 A1* 8/2016 Cho ..................... A61B 5/4809
(Continued)

FOREIGN PATENT DOCUMENTS

CN          114783390 A      7/2022
JP          2012133524 A     7/2012
(Continued)

OTHER PUBLICATIONS

Wang et al., Translation of CN_114783390, Jul. 22, 2022 (Year: 2022).*
(Continued)

*Primary Examiner* — Dmitriy Bolotin
(74) *Attorney, Agent, or Firm* — Osha Bergman Watanabe & Burton LLP

(57) ABSTRACT

An information processing apparatus includes a memory which temporarily stores a program of a system and programs running on the system; and a processor which executes processing based on the programs stored in the memory. The processor performs first processing to perform control between display on and display off of a display unit based on the program of the system and control the brightness of the display unit in the display-on state based on a brightness setting value, second processing to change the brightness setting value based on a program running on the system in the display-on state, and third processing in which, when performing control from the display-on state to the display off by the first processing, the brightness setting value changed by the second processing based on the program running on the system is restored to the brightness setting value before change.

5 Claims, 4 Drawing Sheets

(52) U.S. Cl.
CPC . *G09G 2330/023* (2013.01); *G09G 2330/026* (2013.01); *G09G 2354/00* (2013.01)

(58) Field of Classification Search
CPC ....... G09G 2330/022; G09G 2330/023; G09G 2330/026; G09G 2330/027; G09G 2354/00; G09G 3/20; G09G 3/3406; G09G 5/10
See application file for complete search history.

(56) References Cited

U.S. PATENT DOCUMENTS

| | | | | |
|---|---|---|---|---|
| 2022/0382359 | A1* | 12/2022 | Kosugi | G06F 1/3231 |
| 2024/0321163 | A1* | 9/2024 | Nishio | G09G 5/10 |
| 2024/0321236 | A1* | 9/2024 | Nishio | G06T 7/70 |

FOREIGN PATENT DOCUMENTS

| | | | |
|---|---|---|---|
| JP | 2016148895 A | 8/2016 |
| JP | 2020102151 A | 7/2020 |
| JP | 2020187092 A | 11/2020 |
| JP | 2022183484 A | 12/2022 |

OTHER PUBLICATIONS

Extended European Search Report issued in European Application No. 23213954.3, dated Mar. 18, 2024 (20 pages).

\* cited by examiner

INFORMATION PROCESSING APPARATUS AND CONTROL METHOD

CROSS-REFERENCE TO RELATED APPLICATIONS

This application claims priority to Japanese Patent Application No. 2023-008189 filed on Jan. 23, 2023, the contents of which are hereby incorporated herein by reference in their entirety.

BACKGROUND OF THE INVENTION

Field of the Invention

The present invention relates to an information processing apparatus and a control method.

Description of the Related Art

In recent years, a function to reduce power by adjusting the brightness of a display unit (display) has been attracting attention due to expectations for ESG (Environment, Social, Governance). For example, there is an information processing apparatus such as a personal computer to reduce the brightness of the display unit when a person has moved away or when a person is facing sideways even in a case where the person is present, and then perform control to turn off the display and cause the system to make a transition to a standby state.

For example, in Japanese Unexamined Patent Application Publication No. 2016-148895, there is disclosed an apparatus which detects that a person has approached or has moved away using an infrared sensor to make a transition to a usable state when detecting that the person has approached or to a state with reduced power consumption when detecting that the person has moved away. Further, in recent years, with the development of computer vision and the like, detection accuracy when detecting a face from an image has been getting higher. Therefore, person detection by face detection is also performed instead of person detection by the infrared sensor. In the person detection by face detection, since the orientation of a face can be detected in addition to simply detecting a person, it is used to control the brightness of a display unit according to the orientation of the face as described above.

However, after the brightness setting value is changed to reduce the brightness of the display unit using person detection processing, when the system is booted again, it may not make it in time to restore the brightness so that a user will look at a screen with a brightness remaining reduced (dark screen). For example, there is a case where the brightness setting cannot be controlled immediately after boot-up due to the restriction of the OS (Operating System) such as Windows (registered trademark).

The present invention has been made in view of the above circumstances, and it is an object thereof to provide an information processing apparatus and a control method capable of properly controlling the brightness of a display unit at boot-up.

SUMMARY OF THE INVENTION

An information processing apparatus according to the first aspect of the present invention includes: a memory which temporarily stores a program of a system and programs running on the system; and a processor which executes processing based on the programs stored in the memory, wherein the processor performs first processing to perform control between display on and display off of a display unit based on the program of the system and control the brightness of the display unit in the display-on state based on a brightness setting value, second processing to change the brightness setting value based on a program running on the system in the display-on state, and third processing in which, when performing control from the display-on state to the display off by the first processing, the brightness setting value changed by the second processing based on the program running on the system is restored to the brightness setting value before change.

The above information processing apparatus may be such that, in the second processing, the processor changes the brightness setting value based on the orientation of a face of a person present in a predetermined detection range.

The above information processing apparatus may also be such that, in the second processing, the processor changes the brightness setting value based on the fact that the person present in the predetermined detection range is no longer present is detected.

The above information processing apparatus may further be such that, before changing the brightness setting value by the second processing, the processor stores, in a storage unit, the brightness setting value before change, and restores the brightness setting value to the brightness setting value before change by the third processing based on the stored brightness setting value.

Further, the above information processing apparatus may be such that, when performing control to the display on again after performing control from the display-on state to the display off by the first processing, the processor controls the brightness of the display unit based on the brightness setting value restored to before change by the third processing.

Further, the above information processing apparatus may be such that, when causing the system to make a transition to a standby state and booting the system from the standby state after performing control from the display-on state to the display off by the first processing, the processor controls the brightness of the display unit based on the brightness setting value restored to before change by the third processing.

Further, a control method according to the second aspect of the present invention is a control method for an information processing apparatus including: a memory which temporarily stores a program of a system and programs running on the system; and a processor which executes processing based on the programs stored in the memory, the control method including: a step of causing the processor to perform control between display on and display off of a display unit based on the program of the system; a step of causing the processor to control the brightness of the display unit in the display-on state based on a brightness setting value; a step of causing the processor to change the brightness setting value based on a program running on the system in the display-on state; and a step in which, when performing control from the display-on state to the display off, the processor restores the brightness setting value changed based on the program running on the system to the brightness setting value before change.

The above-described aspects of the present invention can properly control the brightness of a display unit at boot-up.

DETAILED DESCRIPTION OF THE INVENTION

Embodiments of the present invention will be described below with reference to the accompanying drawings.

Overview

First, an overview of an information processing apparatus according to one or more embodiments will be described.

Figure 1:
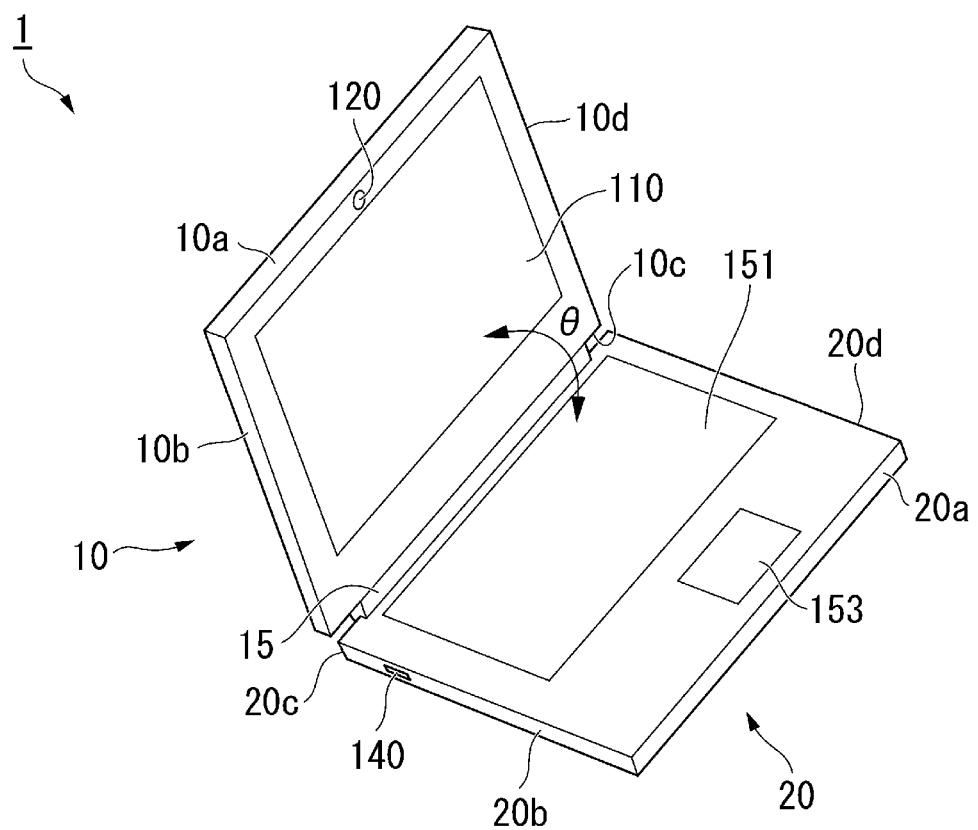
FIG. 1 is a perspective view illustrating a configuration example of the appearance of an information processing apparatus according to one or more embodiments.

FIG. 1 is a perspective view illustrating a configuration example of the appearance of an information processing apparatus 1 according to one or more embodiments.

The information processing apparatus 1 is, for example, a laptop (clamshell) PC (Personal Computer). The information processing apparatus 1 includes a first chassis 10, a second chassis 20, and a hinge mechanism 15. The first chassis 10 and the second chassis 20 are joined by using the hinge mechanism 15. The first chassis 10 is rotatable around the rotation axis of the hinge mechanism 15 relative to the second chassis 20. An open angle by the rotation between the first chassis 10 and the second chassis 20 is denoted by "θ" in FIG. 1.

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the information processing apparatus 1 in FIG. 1 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when a user uses the information processing apparatus 1, and the information processing apparatus 1 is often used in a state where the open angle is typically about θ=100° to 130°. Note that the range of open angles θ to be the open state can be set arbitrarily according to the range of angles rotatable by the hinge mechanism 15, or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can be directed in a direction facing a display screen of the display unit 110.

In the open state, the imaging unit 120 images a predetermined imaging range in the direction facing the display screen of the display unit 110 (that is, in front of the information processing apparatus 1). The predetermined imaging range is an angle-of-view range defined by an image sensor included in the imaging unit 120 and an optical lens provided in front of the imaging surface of the image sensor. For example, the imaging unit 120 can capture an image including a person (user) present in front of the information processing apparatus 1.

Further, a power button 140 is provided on the side face 20b of the second chassis 20. The power button 140 is an operating element used by the user to give an instruction to power on or power off, make a transition from a standby state to a normal operating state, make a transition from the normal operating state to the standby state, or the like. The normal operating state is an operating state capable of executing processing without being particularly limited, which corresponds, for example, to S0 state defined in the ACPI (Advanced Configuration and Power Interface) specification.

The standby state is a state in which at least part of system processing is limited and power consumption is lower than that in the normal operating state. For example, the standby state may be the standby state or a sleep state, modern standby in Windows (registered trademark), or a state corresponding to S3 state (sleep state) defined in the ACPI specification.

Further, a keyboard 151 and a touch pad 153 are provided on the inner face of the second chassis 20 as an input device to accept user operation input. Note that a touch sensor may also be provided as the input device instead of or in addition to the keyboard 151 and the touch pad 153, or a mouse and an external keyboard may be connected. When the touch sensor is provided, an area corresponding to the display screen of the display unit 110 may be constructed as a touch panel to accept operations. Further, a microphone used to input voice may be included in the input device.

Note that, in the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, and put in a state of being disabled from fulfilling the functions.

The information processing apparatus 1 executes HPD (Human Presence Detection) processing to detect a person present in front of the information processing apparatus 1 based on a captured image captured by the imaging unit 120.

Figure 2:
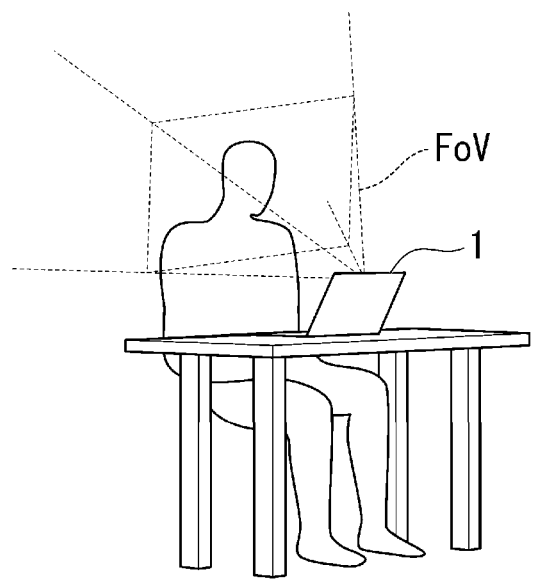
FIG. 2 is a diagram illustrating an example of a person detection range of the information processing apparatus according to one or more embodiments.

FIG. 2 is a diagram illustrating an example of a person detection range of the information processing apparatus 1 according to one or more embodiments. In the illustrated example, a detection range FoV (Field of View: detection viewing angle) in front of the information processing apparatus 1 is a person-detectable range.

For example, the information processing apparatus 1 detects a face area with a face captured therein from the captured image captured by the imaging unit 120 to determine whether or not a person (user) is present in front of the information processing apparatus 1. The detection range FoV corresponds to the imaging angle of view of the information processing apparatus 1. When the face area is detected from the captured image, the information processing apparatus 1 determines that the person is present. On the other hand, when no face area is detected from the captured image, the information processing apparatus 1 determines that no person is present.

The information processing apparatus 1 controls the operating state of the system of the information processing apparatus 1 depending on the presence or absence of a person by HPD processing. For example, when a person is present in front of the information processing apparatus 1, the information processing apparatus 1 controls the operating state to the normal operating state, while when no person is present in front of the information processing apparatus 1, the information processing apparatus 1 controls the operating state to the standby state.

Figure 3A:
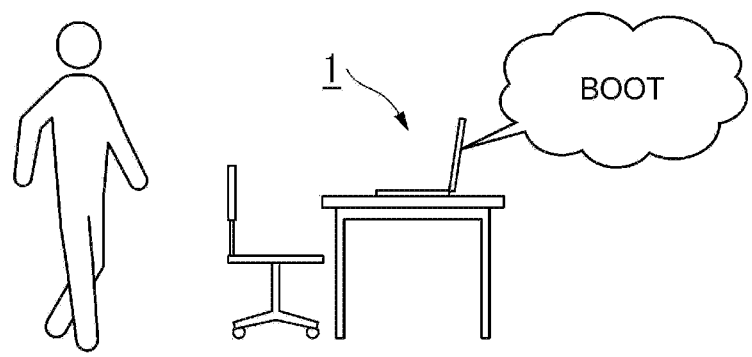
FIGS. 3A-3C are diagrams for describing the outline of HPD processing of the information processing apparatus according to one or more embodiments.
Figure 3B:
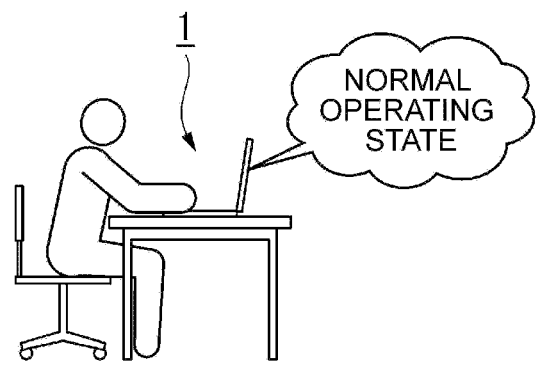
Figure 3C:
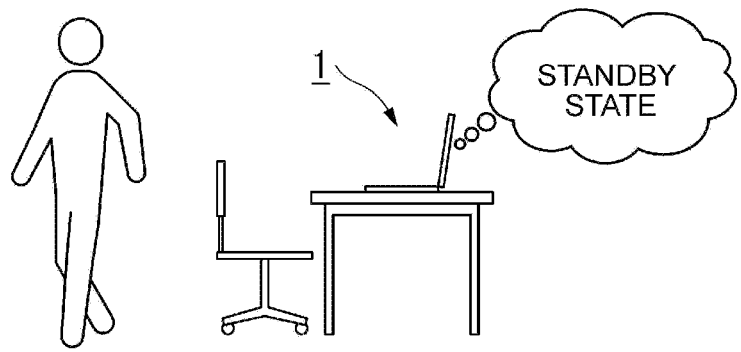

FIGS. 3A-3C are diagrams for describing the outline of HPD processing of the information processing apparatus 1 according to one or more embodiments. The information processing apparatus 1 detects a person present in front of the information processing apparatus 1 by HPD processing, and controls the operating state of the system of the information processing apparatus 1 depending on the presence or absence of a person. For example, in the standby state as illustrated in FIG. 3A, when detecting a change from a state where no person is present in front of the information processing apparatus 1 (Absence) to a state where a person is present (Presence), that is, when detecting that a person has approached the information processing apparatus 1 (Approach), the information processing apparatus 1 automatically boots the system to make the transition to the normal operating state. Further, in a state where a person is present in front of the information processing apparatus 1 (Presence) in the normal operating state as illustrated in FIG. 3B, the information processing apparatus 1 continues the normal operating state. Further, as illustrated in FIG. 3C, when detecting a change from the state where the person is present in front of the information processing apparatus 1 (Presence) to a state where no person is present (Absence), that is, when detecting that the person has left the information processing apparatus 1 (Leave), the information processing apparatus 1 causes the system to make the transition to the standby state.

Further, when a person is present in front of the information processing apparatus 1, the information processing apparatus 1 detects the orientation of a face of the person. Here, the orientation of a face is an orientation corresponding to a rotation angle in the left and right direction and an orientation corresponding to a rotation angle in the vertical direction. In the following, it is assumed that a state where the face is facing the direction of the information processing apparatus 1 (the direction of the display unit 110 and the imaging unit 120) is a state where the face is facing forward. For example, the information processing apparatus 1 determines whether or not the face of the person is facing forward.

Here, since the state where the face is facing forward is a state where the person is paying attention to the information processing apparatus 1, this state is called "Attention." On the other hand, the state where the face is not facing forward is called "No attention" because the person is not paying attention to the information processing apparatus 1.

For example, when the state changes from "Presence" to "Absence," and from "Attention" to "No attention" even in the case of "Presence," the information processing apparatus 1 reduces the brightness of the display unit 110 to save power. The brightness of the display unit 110 means the brightness of a screen of the display unit 110, and it is called "screen brightness" below.

Here, the original screen brightness before being reduced is, for example, a screen brightness in the state of "Presence" and "Attention," which is a screen brightness based on a brightness setting value initially set in the system, or a brightness setting value obtained by the user changing the brightness setting value. In the following, the screen brightness based on this initially-set brightness setting value or the brightness setting value obtained by the user changing the brightness setting value is called the "standard brightness." Further, a screen brightness reduced from the standard brightness is called the "low brightness." The low brightness is a brightness at least lower than the standard brightness, but as the brightness becomes lower, the effect of power saving increases. For example, the low brightness may be set to a brightness of about 0 to 10% of the standard brightness.

The information processing apparatus 1 changes the brightness setting value to a brightness setting value of the low brightness by HPD processing to set the screen brightness of the display unit 110 to the low brightness. Further, when there is no restoration trigger for more than a certain amount of time after the screen brightness is changed from the standard brightness to the low brightness, the information processing apparatus 1 turns off the display of the display unit 110 and causes the system to make the transition to the standby state. The restoration trigger is, for example, a change from "Absence" to "Presence," a change from "No attention" to "Attention," an operation input on the keyboard 151 or the touch pad 153, or the like. Further, the certain amount of time is a preset time (for example, 30 seconds), which may be able to be set by the user.

Further, when there is a boot trigger in the standby state, the information processing apparatus 1 controls the screen brightness of the display unit 110 to the standard brightness, and boots the system. The boot trigger is, for example, a change from "Absence" to "Presence," an operation on the power button 140, or the like.

Here, when the brightness setting value cannot be controlled immediately after the boot of the system due to the restriction of the OS (Operating System) such as Windows (registered trademark), it cannot stop booting the system in the low brightness state controlled before the transition to the standby state, and hence the low brightness is restored to the standard brightness after the time when it has become possible to control the brightness setting value. Therefore, after the brightness setting value is changed to the brightness setting value of the low brightness and before the transition to the standby state, the information processing apparatus 1 according to one or more embodiments restores the changed brightness setting value to the brightness setting value before change. For example, at the stage when a trigger to cause the system to make the transition to the standby state occurs and before turning off the display of the display unit 110, the information processing apparatus 1 restores the changed brightness setting value to the brightness setting value before change. Thus, when booting the system from the standby state, the information processing apparatus 1 can boot the system while controlling the screen brightness of the display unit 110 to the standard brightness.

Configurations of the information processing apparatus 1 according to one or more embodiments will be described in detail below.

Hardware Configuration of Information Processing Apparatus

Figure 4:
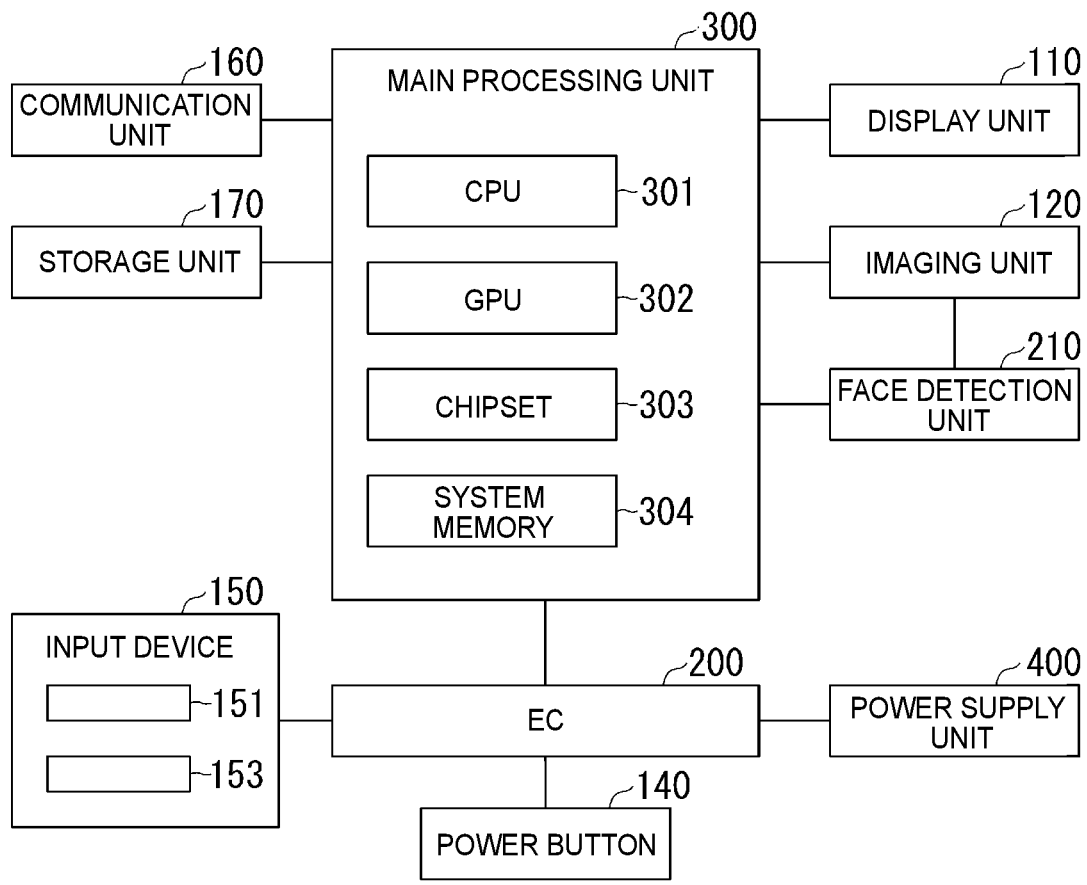
FIG. 4 is a schematic block diagram illustrating an example of the hardware configuration of the information processing apparatus according to one or more embodiments.

FIG. 4 is a schematic block diagram illustrating an example of the hardware configuration of the information processing apparatus 1 according to one or more embodiments. In FIG. 4, components corresponding to respective units in FIG. 1 are given the same reference numerals. The information processing apparatus 1 is configured to include the display unit 110, the imaging unit 120, the power button 140, the input device 150, a communication unit 160, a storage unit 170, an EC (Embedded Controller) 200, a face detection unit 210, a main processing unit 300, and a power supply unit 400.

The display unit 110 displays display data (images) generated based on system processing executed by the main processing unit 300, processing of application programs running on the system processing, and the like.

The imaging unit 120 captures an image of an object within the predetermined imaging range (angle of view) in the direction (frontward) to face the inner face of the first chassis 10, and outputs the captured image to the main processing unit 300 and the face detection unit 210. For example, the imaging unit 120 includes a visible light camera (RGB camera) for capturing an image using visible light and an infrared camera (IR camera) for capturing an image using infrared light.

Note that the imaging unit 120 may be configured to include either one of the visible light camera and the infrared camera, or may be configured to include both of the visible light camera and the infrared camera.

The power button 140 outputs, to the EC 200, an operation signal according to a user operation. The input device 150 is an input unit for accepting user input, which is configured to include, for example, the keyboard 151 and the touch pad 153. In response to accepting operations on the keyboard 151 and the touch pad 153, the input device 150 outputs, to the EC 200, operation signals indicative of operation details.

The communication unit 160 is connected to other devices communicably through a wireless or wired communication network to transmit and receive various data. For example, the communication unit 160 is configured to include a wired LAN interface such as Ethernet (registered trademark), a wireless LAN interface such as Wi-Fi (registered trademark), and the like.

The storage unit 170 is configured to include storage media, such as an HDD (Hard Disk Drive) or an SDD (Solid State Drive), a RAM (Random Access Memory), a ROM (Read Only Memory), and a flash ROM. The storage unit 170 stores the OS, device drivers, various programs such as applications, and various data acquired by the operation of the programs.

The power supply unit 400 supplies power to each unit according to the operating state of each unit of the information processing apparatus 1. The power supply unit 400 includes a DC (Direct Current)/DC converter. The DC/DC converter converts the voltage of DC power, supplied from an AC (Alternate Current)/DC adapter or a battery (battery pack), to a voltage required for each unit. The power with the voltage converted by the DC/DC converter is supplied to each unit through each power system. For example, the power supply unit 400 supplies power to each unit through each power system based on a control signal input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the own ROM, and executes the read control program to fulfill the functionality. The EC 200 operates independently of the main system processing unit 300 to control the operation of the main processing unit 300 and manage the operating state of the main processing unit 300. Further, the EC 200 is connected to the power button 140, the input device 150, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the information processing apparatus 1. Further, the EC 200 acquires operation signals from the power button 140 and the input device 150, and outputs, to the main processing unit 300, an operation signal related to processing of the main processing unit 300 among the acquired operation signals.

The face detection unit 210 is configured to include a processor to execute HPD processing by face detection based on image data of a captured image captured by the imaging unit 120. The face detection unit 210 acquires the image data of the captured image captured by the imaging unit 120, and temporarily stores the acquired image data in a memory. The memory in which the image data is stored may be a system memory 304, or an unillustrated memory in the face detection unit 210.

For example, the face detection unit 210 processes the image data of the captured image acquired from the imaging unit 120 to perform detection of a face area from the captured image, and face detection processing to detect the orientation of a face in the face image included in the detected face area, and the like. As the face detection method, any detection method using a face detection algorithm for detecting a face based on facial feature information, trained data (learned model) subjected to machine learning based on the facial feature information, a face detection library, or the like can be applied.

The main processing unit 300 is configured to include a CPU (Central Processing Unit) 301, a GPU (Graphic Processing Unit) 302, a chipset 303, and the system memory 304, where processing of various application programs is executable on the OS (Operating System) by system processing based on the OS.

The CPU 301 is a processor to execute processing based on a BIOS program, processing based on the OS program, processing based on application programs running on the OS, and the like. For example, the CPU 301 executes boot processing to boot the system from the standby state and make the transition to the normal operating state, sleep processing to make the transition from the normal operating state to the standby state, and the like.

The GPU 302 is connected to the display unit 110. The GPU 302 executes image processing under the control of the CPU 301 to generate display data. The GPU 302 outputs the generated display data to the display unit 110.

The chipset 303 has a function as a memory controller, a function as an I/O controller, and the like. For example, the chipset 303 controls reading data from and writing data to the system memory 304, the storage unit 170, and the like by the CPU 301 and the GPU 302. Further, the chipset 303 controls input/output of data from the communication unit 160, the display unit 110, and the EC 200. Further, the chipset 303 has a function as a sensor hub. For example, the chipset 303 acquires the detection result by face detection processing acquired from the face detection unit 210, and the like, and outputs the acquired detection result and the like to the CPU 301.

The system memory 304 is used as a reading area of a program executed by the CPU 301 and a working area to write processed data. Further, the system memory 304 temporarily stores image data of a captured image captured by the imaging unit 120.

Note that the CPU 301, the GPU 302, and the chipset 303 may also be integrated as one processor, or some or each of them may be configured as an individual processor, respectively. For example, in the normal operating state, the CPU 301, the GPU 302, and the chipset 303 are all operating, but in the standby state, only at least some of the functions of the chipset 303 are operating.

Functional Configuration of Information Processing Apparatus

Next, the functional configuration of the information processing apparatus 1 to control the screen brightness of the display unit 110 by HPD processing will be described in detail.

Figure 5:
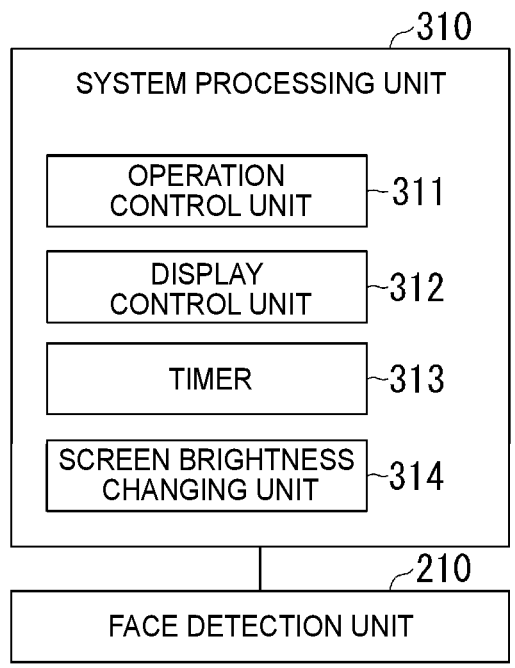
FIG. 5 is a schematic block diagram illustrating an example of the functional configuration of the information processing apparatus according to one or more embodiments.

FIG. 5 is a schematic block diagram illustrating an example of the functional configuration of the information processing apparatus 1 according to one or more embodiments. The information processing apparatus 1 includes the face detection unit 210 and a system processing unit 310. The face detection unit 210 corresponds to the face detection unit 210 in FIG. 4, which executes HPD processing by face detection.

The face detection unit 210 processes image data of a captured image acquired from the imaging unit 120 to detect a face area with a face captured therein from the captured image. When the face area is detected from the captured image, the face detection unit 210 outputs "Presence" information indicating that a person is present in front of the information processing apparatus 1. On the other hand, when no face area is detected from the captured image, the face detection unit 210 outputs "Absence" information indicating that no person is present in front of the information processing apparatus 1.

Further, when the face area is detected from the captured image, the face detection unit 210 detects the orientation of a face of a face image included in the detected face area. For example, the face detection unit 210 detects an orientation corresponding to a rotation angle of the face in the left and right direction and an orientation corresponding to a rotation angle of the face in the vertical direction to determine whether or not the face is facing forward. When determining that the face is facing forward, the face detection unit 210 outputs "Attention" information indicative of a state where the person is paying attention to the information processing apparatus 1. On the other hand, when determining that the face is not facing forward, the face detection unit 210 outputs "No attention" information indicative of a state where the person is not paying attention to the information processing apparatus 1.

The system processing unit 310 is a functional component implemented by the CPU 301 executing programs of the BIOS and the OS, or programs running on the OS. For example, the system processing unit 310 includes an operation control unit 311, a display control unit 312, and a timer 313 as functional components implemented by executing the OS program. Further, the system processing unit 310 includes a screen brightness changing unit 314 as a functional component implemented by executing a program running on the OS.

The operation control unit 311 controls the operating state of the system. For example, when the power button 140 is operated in the standby state, the operation control unit 311 boots the system from the standby state based on an operation signal acquired from the power button 140 through the EC 200. Further, in the normal operating state, the operation control unit 311 performs processing such as system shutdown, transition to the standby state, reboot of the system, or the like based on an operation on a power menu of the OS displayed on the display unit 110 (shutdown, sleep, reboot, or the like).

Further, the operation control unit 311 controls the operating state of the system according to HPD processing by the face detection unit 210. For example, when acquiring, from the face detection unit 210, "Absence" information or "No attention" information in the normal operating state, the operation control unit 311 starts measuring time by the timer 313 and makes the transition to the standby state after a certain amount of time has passed. Specifically, the operation control unit 311 gives an instruction to the display control unit 312 to make the transition to the standby state so as to turn off the display of the display unit 110. After that, the operation control unit 311 locks the system and makes the transition to the standby state. The lock of the system is a state in which the system is unusable until the lock is released (for example, until the user is authenticated).

Note that when "Presence" information or "Attention" information is acquired (when there is the restoration trigger) before the certain amount of time passes, the operation control unit 311 stops measuring time by the timer 313, and continues the normal operating state. Further, even when an operation signal is acquired from the input device 150 before the certain amount of time passes, the operation control unit 311 may stop measuring time by the timer 313, and continue the normal operating state.

Further, when "Attention" information is acquired from the face detection unit 210 (when there is the boot trigger) in the standby state, the operation control unit 311 boots the system to make the transition to the normal operating state.

The display control unit 312 performs control to display on and display off of the display unit 110. Further, the display control unit 312 controls the screen brightness of the display unit 110 in the display-on state. Specifically, the display control unit 312 controls the screen brightness of the display unit 110 based on the brightness setting value stored in the storage unit 170. This brightness setting value is initially set in the system, but the brightness setting value can also be changed from the initial setting by the user depending on the usage environment and preference of the user.

The screen brightness changing unit 314 changes the brightness setting value stored in the storage unit 170 based on the HPD processing by the face detection unit 210. For example, when "No attention" information is acquired from the face detection unit 210 in the normal operating state (in the display-on state of the display unit 110), the screen brightness changing unit 314 changes the brightness setting value so that the screen brightness becomes the low brightness. In other words, the screen brightness changing unit 314 changes the brightness setting value based on the fact that the person present in the detection range FoV is no longer present is detected.

Further, when "No attention" information is acquired from the face detection unit 210 in the normal operating state (in the display-on state of the display unit 110), the screen brightness changing unit 314 changes the brightness setting value so that the screen brightness becomes the low brightness. In other words, the screen brightness changing unit 314 changes the brightness setting value based on the orientation of the face of the person present in the detection range FoV.

Further, when the display unit 110 is controlled from the display-on state to the display-off based on the HPD processing, the screen brightness changing unit 314 restores the changed brightness setting value to the brightness setting value before change. For example, when the operation control unit 311 gives an instruction to make the transition from the normal operating state to the standby state, the screen brightness changing unit 314 detects the instruction, and restores the brightness setting value to the brightness setting value before change.

Note that the screen brightness changing unit 314 stores, for example, in the storage unit 170, the brightness setting value of the low brightness, and the brightness setting value before change. The brightness setting value of the low brightness is preset, which is set, for example, to a value for a screen brightness of about 0 to 10% of the standard brightness. Further, for example, before changing from the brightness setting value of the standard brightness to the brightness setting value of the low brightness, the screen brightness changing unit 314 stores, in the storage unit 170, the brightness setting value before change. Then, after the brightness setting value is changed to the brightness setting value of the low brightness, when the display unit 110 is controlled from the display-on state to the display off, the screen brightness changing unit 314 restores the brightness setting value to the brightness setting value before change based on the brightness setting value stored in the storage unit 170.

Thus, when controlling the display unit 110 to the display-on state again after performing control from the display-on state to the display off, the display control unit 312 can control the screen brightness of the display unit 110 properly based on the brightness setting value restored to before change by the screen brightness changing unit 314. In other words, in the case where the system is caused to make the transition to the standby state after the display unit 110 is controlled from the display-on state to the display off, the system processing unit 310 can control the screen brightness of the display unit 110 properly based on the brightness setting value restored to before change when booting the system from the standby state.

Operation of Processing

Next, operation of HPD control processing to control the screen brightness properly at boot-up after the system processing unit 310 changes the screen brightness to the low brightness by the HPD processing and then causes the system to make the transition to the standby state will be described.

Figure 6:
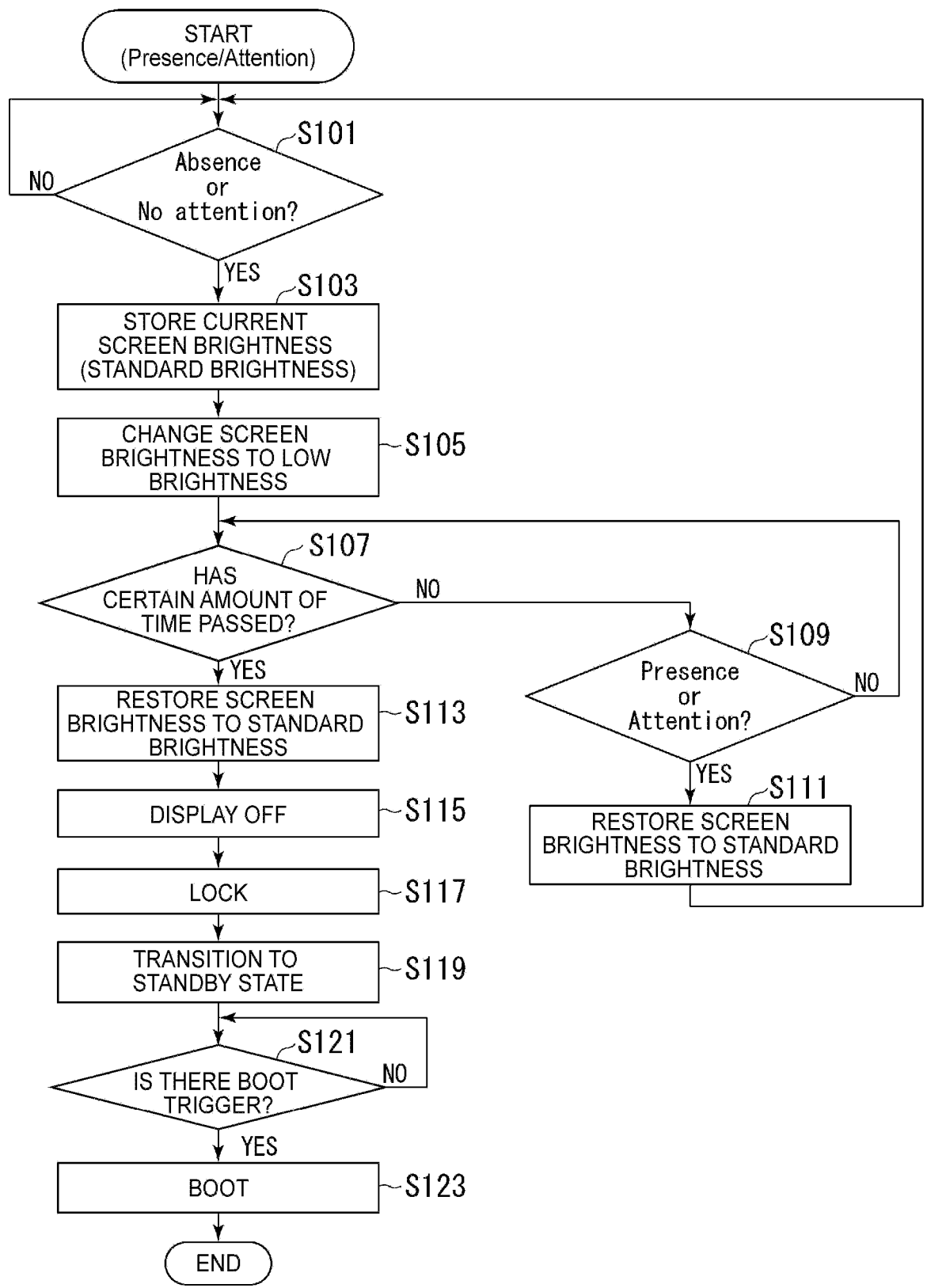
FIG. 6 is a flowchart illustrating an example of HPD control processing according to one or more embodiments.

FIG. 6 is a flowchart illustrating an example of HPD control processing according to one or more embodiments.

Here, it is assumed that the information processing apparatus 1 is in the state of "Presence" and "Attention" in the normal operating state, and the screen brightness of the display unit 110 is controlled to the standard brightness.

(Step S101) The system processing unit 310 determines whether or not "Absence" information or "No attention" information is acquired from the face detection unit 210. When determining that "Absence" information or "No attention" information is acquired from the face detection unit 210 (YES), the system processing unit 310 proceeds to a process in step S103. On the other hand, when determining that both of "Absence" information and "No attention" information are not acquired from the face detection unit 210 (NO), the system processing unit 310 performs the process in step S101 again.

(Step S103) The system processing unit 310 stores, in the storage unit 170, the brightness setting value of the current screen brightness (standard brightness). In other words, the system processing unit 310 stores, in the storage unit 170, the brightness setting value before being changed to the brightness setting value of the low brightness. Then, the system processing unit 310 proceeds to a process in step S105.

(Step S105) The system processing unit 310 changes the brightness setting value of the screen brightness to the brightness setting value of the low brightness to change the screen brightness to the low brightness. Then, the system processing unit 310 proceeds to a process in step S107.

(Step S107) The system processing unit 310 determines whether or not a certain amount of time has passed since the screen brightness was changed to the low brightness. When determining that the certain amount of time has not passed since the screen brightness was changed to the low brightness (NO), the system processing unit 310 proceeds to a process in step S109. On the other hand, when determining that the certain amount of time has passed since the screen brightness was changed to the low brightness (YES), the system processing unit 310 gives the instruction to make the transition to the standby state, and proceeds to a process in step S113.

(Step S109) The system processing unit 310 determines whether or not "Presence" information or "Attention" information is acquired from the face detection unit 210. When determining that both of "Presence" information and "Attention" information are not acquired from the face detection unit 210 (NO), the system processing unit 310 returns to the process in step S107 because there is no restoration trigger. On the other hand, when determining that "Presence" information or "Attention" information is acquired from the face detection unit 210 (YES), the system processing unit 310 determines that there is the restoration trigger, and proceeds to a process in step S111.

(Step S111) The system processing unit 310 changes the brightness setting value of the screen brightness to the brightness setting value (the brightness setting value of the standard brightness) stored in step S103 to restore the screen brightness to the standard brightness. Then, the system processing unit 310 returns to the process in step S101.

(Step S113) In response to giving the instruction to make the transition to the standby state, the system processing unit 310 changes the brightness setting value of the screen brightness to the brightness setting value (the brightness setting value of the standard brightness) stored in step S103 to restore the screen brightness to the standard brightness. Then, the system processing unit 310 controls the display unit 110 to display off (step S115), locks the system (step S117), and makes the transition to the standby state (step S119). Then, the system processing unit 310 proceeds to a process in step S121.

(Step S121) The system processing unit 310 determines whether or not there is the boot trigger. For example, when "Presence" information is acquired from the face detection unit 210, or when an operation signal is acquired from the power button 140, the system processing unit 310 determines that there is the boot trigger. When determining that there is the boot trigger (YES), the system processing unit 310 proceeds to a process in step S123. On the other hand, when determining that there is no boot trigger (NO), the system processing unit 310 performs the process in step S121 again.

(Step S123) The system processing unit 310 boots the system to make the transition from the standby state to the normal operating state. When booting this system, the system processing unit 310 controls the screen brightness of the display unit 110 to the standard brightness based on the brightness setting value of the standard brightness changed in step S113.

SUMMARY OF EMBODIMENTS

As described above, the information processing apparatus 1 according to one or more embodiments includes: a memory (for example, the system memory 304) which temporarily stores a program of the system (for example, BIOS, OS, or the like) and programs running on the system (for example, programs of applications, drivers, services, and the like); and a processor (for example, the CPU 301, the GPU 302, the chipset 303, or the like) which executes processing based on the programs stored in the memory. For example, the CPU 301 performs first processing to perform control between display on and display off of the display unit 110 based on the program of the OS and control the screen brightness of the display unit 110 when the display unit 110 is in the display-on state based on a brightness setting value. Further, the CPU 301 performs second processing to change the above brightness setting value based on a program running on the OS when the display unit 110 is in the display-on state, and third processing in which, when the display unit 110 is controlled from the display-on state to the display off by the above first processing, the brightness setting value changed by the above second processing based on the program running on the OS is restored to the brightness setting value before change.

Thus, at boot-up after the screen brightness is changed to the low brightness and then the transition to the standby state is made, the information processing apparatus 1 can boot the system with the standard brightness before the screen brightness of the display unit 110 is changed to the low brightness. Therefore, the information processing apparatus 1 can properly control the screen brightness of the display unit 110 at boot-up.

For example, in the above second processing, the CPU 301 changes the brightness setting value based on the orientation of a face of a person present in the detection range FoV (an example of a predetermined detection range).

Thus, for example, when the user is not facing forward (when the user is not facing the direction of the information processing apparatus 1), the information processing apparatus 1 can control the screen brightness to the low brightness to save power.

For example, in the above second processing, the CPU 301 changes the brightness setting value based on the fact that the person present in the detection range FoV (the example of the predetermined detection range) is no longer present.

Thus, for example, when the user is not present in front of the information processing apparatus 1, the information processing apparatus 1 can control the screen brightness to the low brightness to save power. Further, when the user is not present in front of the information processing apparatus 1, since the content being displayed on the display unit 110 can be made invisible, the information processing apparatus 1 can also improve security.

Further, the CPU 301 stores, in the storage unit 170 (an example of a storage unit), the brightness setting value before being changed by the above second processing, and restores the brightness setting value to the brightness setting value before change by the above third processing based on the stored brightness setting value.

Thus, since the screen brightness before being changed to low brightness is stored on the side of the program running on the OS, the information processing apparatus 1 can restore the screen brightness before change regardless of the processing of the OS.

Further, when the display unit 110 is controlled to the display on again after the display unit 110 is controlled from display-on state to the display off by the above first processing, the CPU 301 controls the screen brightness of the display unit 110 based on the brightness setting value restored to before change by the above third processing.

Thus, when controlling the display unit 110 to the display on, the information processing apparatus 1 can control the screen brightness of the display unit 110 to the standard brightness based on the brightness setting value by the OS processing.

Further, when booting the system from the standby state after the display unit 110 is controlled from display-on state to the display off by the above first processing and then the transition of the system to the standby state is made, the CPU 301 controls the screen brightness of the display unit 110 by the above third processing based on the brightness setting value restored to before change.

Thus, the information processing apparatus 1 can control the screen brightness of the display unit 110 to the standard brightness based on the brightness setting value by the OS processing at boot-up.

A control method for the information processing apparatus 1 includes: a step of causing the CPU 301 to perform control between display on and display off of the display unit 110 based on a program of an OS; a step of causing the CPU 301 to control the screen brightness of the display unit 110 in the display-on state based on a brightness setting value; a step of causing the CPU 301 to change the above brightness setting value based on a program running on the OS when the display unit 110 is in the display-on state; and a step in which, when controlling the display unit 110 from the display-on state to the display off, the CPU 301 restores the brightness setting value changed based on the program running on the OS to the brightness setting value before change.

Thus, at boot-up after the screen brightness is controlled to the low brightness and the transition to the standby state is made, the information processing apparatus 1 can boot the system with the standard brightness before the screen brightness of the display unit 110 is changed to the low brightness. Therefore, the information processing apparatus 1 can control the screen brightness of the display unit 110 properly at boot-up.

While embodiments of this invention has been described in detail above, the specific configurations are not limited to those in the one or more embodiments described above, and design changes are also included without departing from the scope of this invention. For example, the respective components described in the above one or more embodiments can be combined arbitrarily.

Further, in the aforementioned one or more embodiments, the configuration in which the face area and the face orientation are detected from the captured image captured by the imaging unit 120 is described, but the configuration may be such that the detection of the face orientation is not performed. For example, the configuration may be such that the face area is detected from the captured image to detect the presence or absence of a person (user) present in front of the information processing apparatus 1 in order to perform control of the screen brightness and control of the operating state of the system.

Further, in the aforementioned one or more embodiments, the configuration in which the face area is detected from the captured image captured by the imaging unit 120 to detect the person (user) present in front of the information processing apparatus 1 is described, but a ranging sensor such as a ToF sensor may also be used together in addition to the imaging unit 120, or only the ranging sensor may be used to detect the person (user) present in front of the information processing apparatus 1.

Further, the configuration example in which the imaging unit 120 is built in the information processing apparatus 1 is described, but the present invention is not limited to this example. For example, the imaging unit 120 does not have to be built in the information processing apparatus 1, which may also be attachable to the information processing apparatus 1 (for example, onto any one of the side faces 10a, 10b, 10c, and the like) and communicably connected to the information processing apparatus 1 wirelessly or by wire as an external accessory of the information processing apparatus 1.

Further, in the aforementioned one or more embodiments, the configuration example in which, when the screen brightness is changed to the low brightness by the HPD processing, transitions to the display off and the standby state are made after the screen brightness is restored to before change is described. Even when the screen brightness is changed by the function of a program different from that of the OS regardless of control by the HPD processing, such a configuration that the transitions to the display off and the standby state are made after the screen brightness is restored to before change can be made in the same way.

Further, in the aforementioned embodiments, the example in which the face detection unit 210 is provided separately from the CPU 301 and the chipset 303 is illustrated, but some or all of the functions of the face detection unit 210 may be provided by the chipset 303, or provided by a processor integrated with the CPU 301 or the chipset 303. For example, the CPU 301, the chipset 303, and the face detection unit 210 may be configured as individual processors, or may be integrated as one processor. Further, some or all of the functions of the face detection unit 210 may be provided by the EC 200.

Further, a hibernation state, a power-off state, and the like may be included as the standby state described above. The hibernation state corresponds, for example, to S4 state defined in the ACPI specification. The power-off state corresponds, for example, to S5 state (shutdown state) defined in the ACPI specification. Note that the standby state, the sleep state, the hibernation state, the power-off state, and the like as the standby state are states lower in power consumption than the normal operating state (states of reducing power consumption).

Note that the information processing apparatus 1 described above has a computer system therein. Then, a program for implementing the function of each component included in the information processing apparatus 1 described above may be recorded on a computer-readable recording medium so that the program recorded on this recording medium is read into the computer system and executed to perform processing in each component included in the information processing apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a portable medium like a flash ROM or a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the information processing apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the information processing apparatus 1 in embodiments described above may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the information processing apparatus 1 of embodiments mentioned above is not limited to the laptop PC, which may also be a desktop PC or the like.

DESCRIPTION OF SYMBOLS 1 information processing apparatus
10 first chassis 20 second chassis
15 hinge mechanism
110 display unit
120 imaging unit
140 power button
150 input device
151 keyboard
153 touch pad
160 communication unit
170 storage unit
200 EC
210 face detection unit
300 main processing unit
301 CPU
302 GPU
303 chipset
304 system memory
310 system processing unit
311 operation control unit
312 display control unit
313 timer
314 screen brightness changing unit
400 power supply unit

What is claimed is:

1. An information processing apparatus comprising:
a memory which temporarily stores a program of a system and programs running on the system; and
a processor which executes processing based on the programs stored in the memory, wherein the processor performs
first processing to perform control between display on and display off of a display unit based on the program of the system and control brightness of the display unit in a display-on state based on a brightness setting value,
second processing to decrease, from an original value to a decreased value lower than the original value, the brightness setting value in the display-on state and storing the original value, and
third processing in which, when performing control from the display-on state to the display off by the first processing, the brightness setting value decreased by the second processing is increased from the decreased value to the original value based on the stored original value; and
in response to a trigger to cause the apparatus to make a transition to a standby state, and before turning off the display of the display unit, the processor increases the brightness setting value from the decreased value to the original value, and upon booting of the apparatus from the standby state, the processor controls the brightness of the display unit based on the stored original value.

2. The information processing apparatus according to claim 1, wherein
in the second processing, the processor changes the brightness setting value based on an orientation of a face of a person present in a predetermined detection range.

3. The information processing apparatus according to claim 1, wherein
in the second processing, the processor changes the brightness setting value based on a person presence in a predetermined detection range is no longer present is detected.

4. The information processing apparatus according to claim 1, wherein
when performing control to the display on again after performing control from the display-on state to the display off by the first processing, the processor controls the brightness of the display unit based on the brightness setting value restored to before change by the third processing.

5. A control method for an information processing apparatus including: a memory which temporarily stores a program of a system and programs running on the system; and a processor which executes processing based on the programs stored in the memory, the control method comprising:
a step of causing the processor to perform control between display on and display off of a display unit based on the program of the system;
a step of causing the processor to control brightness of the display unit in a display-on state based on a brightness setting value;
a step of causing the processor to decrease, from an original value to a decreased value lower than the original value, the brightness setting value in the display-on state and storing the original value; and
a step in which, when performing control from the display-on state to the display off, the processor increases the brightness setting value from the decreased value to the original value based on the stored original value; and
in response to a trigger to cause the apparatus to make a transition to a standby state, and before turning off the display of the display unit, causing the processor to increase the brightness setting value from the decreased value to the original value, and upon booting of the apparatus from the standby state, causing the processor to control the brightness of the display unit based on the stored original value.

* * * * *